United States Patent
Friman et al.

(10) Patent No.: US 12,000,503 B2
(45) Date of Patent: Jun. 4, 2024

(54) VALVE POSITIONER AND DIAGNOSTIC METHOD

(71) Applicant: VALMET FLOW CONTROL OY, Vantaa (FI)

(72) Inventors: Mats Friman, Vantaa (FI); Kalle Pokki, Vantaa (FI); Tommi Bergström, Vantaa (FI)

(73) Assignee: NELES FINLAND OY, Vantaa (FI)

( * ) Notice: Subject to any disclaimer, the term of this patent is extended or adjusted under 35 U.S.C. 154(b) by 456 days.

(21) Appl. No.: 17/273,221

(22) PCT Filed: Sep. 3, 2019

(86) PCT No.: PCT/FI2019/050624
§ 371 (c)(1),
(2) Date: Mar. 3, 2021

(87) PCT Pub. No.: WO2020/049214
PCT Pub. Date: Mar. 12, 2020

(65) Prior Publication Data
US 2022/0333714 A1    Oct. 20, 2022

(30) Foreign Application Priority Data

Sep. 3, 2018 (FI) ..................................... 20185733

(51) Int. Cl.
*F16K 37/00* (2006.01)
*F16K 31/12* (2006.01)

(52) U.S. Cl.
CPC .......... *F16K 37/0083* (2013.01); *F16K 31/12* (2013.01)

(58) Field of Classification Search
CPC .. F16K 31/12; F16K 31/1635; F16K 31/1655; F16K 37/0025; F16K 37/0083;
(Continued)

(56) References Cited

U.S. PATENT DOCUMENTS 5,748,469 A    5/1998  Pyotsia
5,992,229 A  * 11/1999  Pyotsia ................ G05B 17/02
                                                   700/282
(Continued)

FOREIGN PATENT DOCUMENTS

EP    0 957 418 A2    11/1999
WO    2010/079260 A1   7/2010
(Continued)

OTHER PUBLICATIONS

Apr. 1, 2019 Search Report issued in Finland Patent Application No. 20185733.
(Continued)

*Primary Examiner* — John H Le
(74) *Attorney, Agent, or Firm* — Oliff PLC

(57) ABSTRACT

Fault diagnostics utilize an embedded tracking digital twin of a valve assembly physical part in a microprocessor system of the valve positioner. The digital twin has simulation model parameters including a fault-related simulation model parameter. The digital twin receives a control signal representing a real control of the at least part of the valve assembly, and generates simulated measurements relating to the simulated control result. The digital twin compare the simulated measurements with real measurements that relate to the real control result, to track an error between the results of simulated operation and the real operation of the valve assembly to adjust the fault-related simulation model parameter in a sense that the error is decreased. The fault-related simulation model parameter relates to a specific physical fault in the physical part of the valve assembly, and it is detectable and identifiable based on the simulation model parameter adjusted value.

14 Claims, 6 Drawing Sheets

(58) Field of Classification Search
CPC ... G05B 23/0245; G05B 17/02; F15B 19/005; F15B 19/007; F15B 2211/329; F15B 2211/634; F15B 2211/857; F15B 2211/3144; F15B 2211/6309; F15B 2211/6313; F15B 2211/6336; F15B 2211/6653; F15B 2211/7656; F15B 2211/8855; F15B 20/004; F15B 20/005; F15B 20/008; F15B 13/0433
USPC .......................................................... 702/185
See application file for complete search history.

(56) References Cited

U.S. PATENT DOCUMENTS

| | | |
|---|---|---|
| 6,131,609 A | 10/2000 | Metso et al. |
| 2003/0229408 A1 | 12/2003 | Yasui et al. |
| 2006/0071800 A1 | 4/2006 | Schultz |
| 2012/0011180 A1 | 1/2012 | Kavaklioglu |
| 2017/0286572 A1 | 10/2017 | Hershey et al. |

FOREIGN PATENT DOCUMENTS

| | | |
|---|---|---|
| WO | 2012/001213 A1 | 1/2012 |
| WO | 2018/044062 A2 | 3/2018 |
| WO | 2018/055229 A1 | 3/2018 |

OTHER PUBLICATIONS

Nov. 20, 2019 Search Report issued in International Patent Application No. PCT/FI2019/050624.
Nov. 20, 2019 Written Opinion issued in International Patent Application No. PCT/FI2019/050624.
Oct. 5, 2021 Extended European Search Report issued in European Application No. 19 85 8562.

* cited by examiner

VALVE POSITIONER AND DIAGNOSTIC METHOD

FIELD OF THE INVENTION

The invention relates to control valves, and particularly to diagnostics of control valves using valve positioners.

BACKGROUND OF THE INVENTION

Actuators are frequently used as mechanisms to introduce motion or control motion. It is operated by a source of energy, typically electric current, hydraulic fluid pressure, or pneumatic fluid pressure, and converts that energy into motion of a target mechanism, such as into movement of a closure element of a control valve.

A control valve is generally used for a continuous control of a liquid or gas flow in different pipelines and processes. In a processing industry, such as oil and gas, mining, pulp and paper and chemical industries, different kinds of control valves installed in a plant's pipe system control material flows in the process. A material flow may contain any fluid material, such as fluids, liquors, liquids, gases and steam. The operation of a control valve involves positioning its movable or closing part (e.g. the plug, ball or disc) relative to the stationary seat of the valve. The control valve is usually connected with an actuator whose purpose is to accurately locate the closing element of the valve in a position dictated by a control signal. The actuator moves the closing element of the valve to a desired position between fully open and fully closed positions. The actuator may be a pneumatic or a hydraulic cylinder-piston device, for example. The actuator, for its part, is usually controlled by a valve positioner, also called as a valve controller, for controlling the position of the closing element of the control valve and thus the material flow in the process according to a control signal from a process controller. A position sensor (such as a potentiometer) feeds a signal representing the actual valve position to the positioner. In this way the actuator can be positioned along its stroke in proportion to the control signal. Hence the positioner operates as a feedback controller.

One of the newer devices that offer improved performance of control valves is so-called "smart" positioner or a digital valve controller. One example of a smart positioner is the Neles NDX valve controller sold by Metso Corporation. A smart positioner is a microprocessor-based electronic positioner with internal logic capability which derives benefit from digital programming to obtain improved positioning performance. An advantage of the smart positioner is that it may be programmed to use a position control algorithm to achieve better dynamic response. Further, the smart positioner may use 2-way communications protocols such Hart, Foundation Fieldbus etc. to communicate with a process control system. This type of communication can be used also to enter new control settings or cons figurations remotely after installing a smart positioner.

In addition to the primary purpose of controlling automated valves in the process industry, digital valve controllers may have various additional features that are useful for plant operation. One of the most important additional features is valve diagnostics. The diagnostics needs are simple: plant managers want to know for how long the valve is expected to operate, and if it is going fail, we should tell what part needs service or replacement. So far, no digital valve controller on the market can provide this information. Instead, although digital valve controllers are able to provide various kind historical trends and diagnostics reports for subsequent analysis, experienced service experts are needed to analyse such diagnostics reports. Still, valve diagnostics data is difficult to interpret even for experts.

BRIEF DESCRIPTION OF THE INVENTION

An object of the present invention is to provide a method and an apparatus for implementing the method.

The object of the invention is achieved by a valve positioner and a method recited in the independent claims. The preferred embodiments of the invention are disclosed in the dependent claims.

An aspect of the invention is a valve positioner for a valve assembly, wherein the valve assembly comprises a valve positioner, a control valve, a pneumatic valve actuator, a pressure sensor adapted to measure a pneumatic actuator pressure and a position sensor adapted to measure a valve position of the control valve, and wherein the valve positioner comprises a microprocessor system configured to store and run an embedded valve control and diagnostics software including an embedded valve controller configured to receive a setpoint position and at least the measured valve position and to control the valve position of the control valve, utilizing the pneumatic valve actuator, an embedded tracking digital twin of at least one physical part of the valve assembly, wherein the embedded tracking digital twin comprises a plurality of simulation model parameters, the plurality of simulation model parameters including at least one fault-related simulation model parameter that relates to a specific physical fault in the at least one physical part of the valve assembly, wherein the embedded tracking digital twin is configured to receive a control signal representing a real control of the at least part of the physical valve assembly from the embedded valve controller and to provide at least one simulated measurement result representing a simulated result of a control action in real-time during operation of the valve assembly, wherein the embedded tracking digital twin is configured to track an error between the at least one simulated measurement result and at least one corresponding real physical measurement result, and to adjust a value of the at least one fault-related simulation model parameter of the embedded tracking digital twin in a sense that the error is decreased, in real-time during operation of the valve assembly, and wherein the specific physical fault in the at least one physical part of the valve assembly is detectable and identifiable based on the adjusted value of the at least one simulation model parameter.

In an embodiment, the at least part of the valve assembly comprises one or more of the control valve, the pneumatic valve actuator, a pneumatic pre-stage in the valve positioner, a supply pressure inlet, a pneumatic output stage in the valve positioner, and any combination thereof.

In an embodiment, the embedded tracking digital twin is configured to receive the control signal from the embedded valve controller and to provide a simulated measured valve position and/or a simulated measured pneumatic actuator pressure in real-time during operation of the valve assembly, and the embedded tracking digital twin is configured to track an error between the simulated measured valve position and the measured valve position and/or an error between the simulated measured pneumatic actuator pressure and the measured pneumatic actuator pressure, and to adjust a value of the at least one fault-related simulation model parameter of the embedded tracking digital twin in a sense that the error is decreased, in real-time during operation of the valve assembly.

In an embodiment, the control signal representing the real control of the at least part of the physical valve assembly includes an electrical control signal to a prestage and/or one or more of the at least one real physical measurement result.

In an embodiment, the at least one real physical measurement result relating to the result of the real control in the at least part of the physical valve assembly may include one or more of: the measured valve position, the measured actuator pressure, a further measured actuator pressure, a measured supply pressure, a measured pilot pressure from a pneumatic prestage, a measured control position of a pneumatic output stage, a valve temperature, and a process pressure).

In an embodiment, the valve assembly further comprises a pressure sensor adapted to measure a pneumatic supply pressure, and wherein the embedded tracking digital twin is configured to receive the measured pneumatic supply pressure and to utilize it in adjustment of the plurality of simulation model parameters.

In an embodiment, the microprocessor system of the valve positioner and/or a remote computing entity is configured to detect and identify the specific physical fault in the at least one physical part of the valve assembly when the adjusted value of the at least one fault-related simulation model parameter reaches a predetermined threshold value or a predetermined deviation.

In an embodiment, the microprocessor system of the valve positioner and/or a remote computing entity is configured to predict a future trend of the adjusted value of the at least one fault-related simulation model parameter over the time, and to predict a remaining operation time until the adjusted value of the at least one fault-related simulation model parameter reaches a given limit value or a given deviation limit.

In an embodiment, the microprocessor system of the valve positioner and/or a remote computing entity is configured to predict a remaining useful lifetime of the at least one physical part of the valve assembly.

In an embodiment, the plurality of simulation model parameters includes a plurality of fault-related simulation model parameters which relate to a plurality of different specific physical faults in the in the at least one physical part of the valve assembly.

In an embodiment, the at least one fault-related simulation model parameter represents a specific physical characteristic of the at least one physical part of the valve assembly, such as a physical dimension or a friction, and wherein the value of the specific physical characteristic is related to a specific physical fault.

In an embodiment, the at least one fault-related simulation model parameter is related to one or more of following specific physical characteristics: a valve friction, a cross-sectional size of a pneumatic air supply, a cross-sectional size of a pilot pressure inlet, a cross-sectional size of an actuator pressure leakage hole, a valve friction, a bearing friction, a backlash, fatigue, erosion, wear.

Another aspect of the invention is a valve assembly comprising a control valve, a pneumatic valve actuator, a pressure sensor adapted to measure a pneumatic actuator pressure, a position sensor adapted to measure a valve position of the control valve, and a valve positioner according to any embodiment.

A further aspect of the invention is a diagnostic method in a valve positioner of a valve assembly, comprising measuring a pneumatic actuator pressure of a pneumatic valve actuator of the valve assembly, measuring a valve position of a control valve of the valve assembly, running an embedded valve controller in real-time in a microprocessor system of the valve positioner controlling, by the embedded valve controller, the pneumatic actuator pressure of the pneumatic valve actuator and thereby the valve position of the control valve based on a setpoint position and the measured valve position in real-time during operation of the valve assembly, running an embedded tracking digital twin of at least one physical part of the valve assembly in the microprocessor system of the valve positioner, wherein the embedded tracking digital twin comprises a plurality of simulation model parameters, the plurality of simulation model parameters including at least one fault-related simulation model parameter that relates to a specific physical fault in the at least one physical part of the valve assembly, receiving, by the embedded tracking digital twin, a control signal representing a real control of the at least part of the physical valve assembly from the embedded valve controller and to provide at least one simulated measurement result representing a simulated result of a control in real-time during operation of the valve assembly, generating, by the embedded tracking digital twin, at least one simulated measurement result representing a simulated result of a control action in real-time during operation of the valve assembly, tracking, by the embedded tracking digital twin, an error between the at least one simulated measurement result and at least one corresponding real physical measurement result in real-time during operation of the valve assembly, and adjusting, by the embedded tracking digital twin, a value of the at least one fault-related simulation model parameter of the embedded tracking digital twin in a sense that the error is decreased, in real-time during operation of the valve assembly, wherein the specific physical fault in the at least one physical part of the valve assembly is identifiable based on the adjusted value of the at least one simulation model parameter.

BRIEF DESCRIPTION OF THE DRAWINGS

In the following the invention will be described in greater detail by means of preferred embodiments with reference to the attached drawings, in which

FIG. 7 shows illustrative trends of physical values of fault-related simulation model parameters;

EXAMPLE EMBODIMENTS OF THE INVENTION

Figure 1:
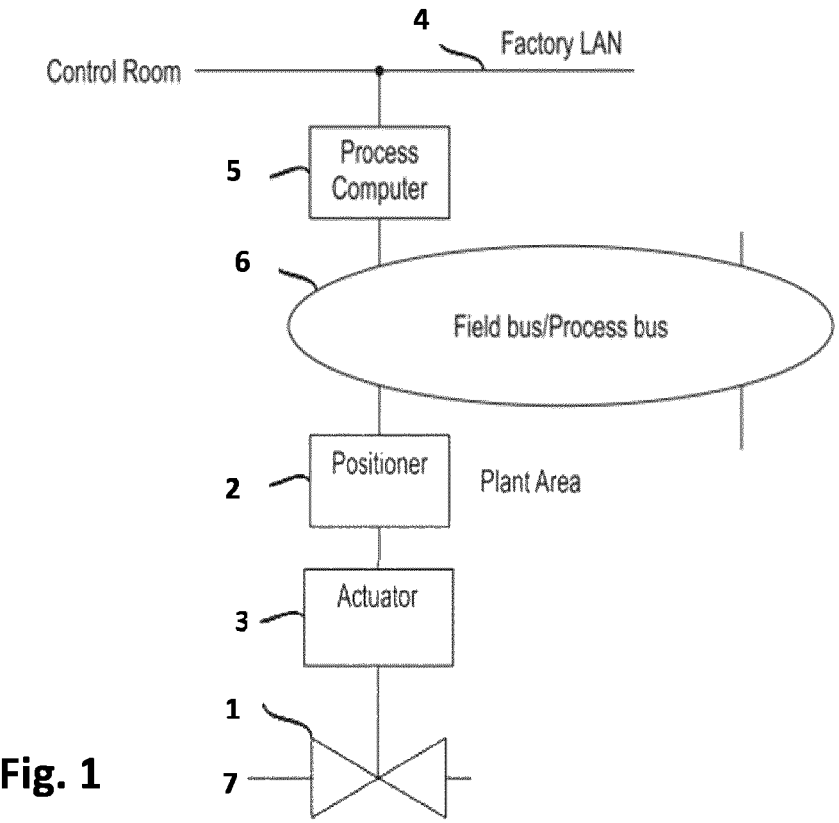
FIG. 1 shows a schematic block diaphragm of an exemplary process automation system.

FIG. 1 shows a schematic block diaphragm of an exemplary process automation system wherein the principles of the invention may be applied in a valve positioner. The control system block 5 generally represents any and all control room computer(s)/programs and process control computer(s)/programs as well as databases, which may be interconnected by a factory LAN 4, in the automation system. There are various architectures for a control system. For example, the control system may be a Direct Digital Control (DDC) system or Distributed Control System (DCS), both well known in the art. It should be appreciated that the type or architecture of the automation system is not relevant to the present invention.

Figure 2:
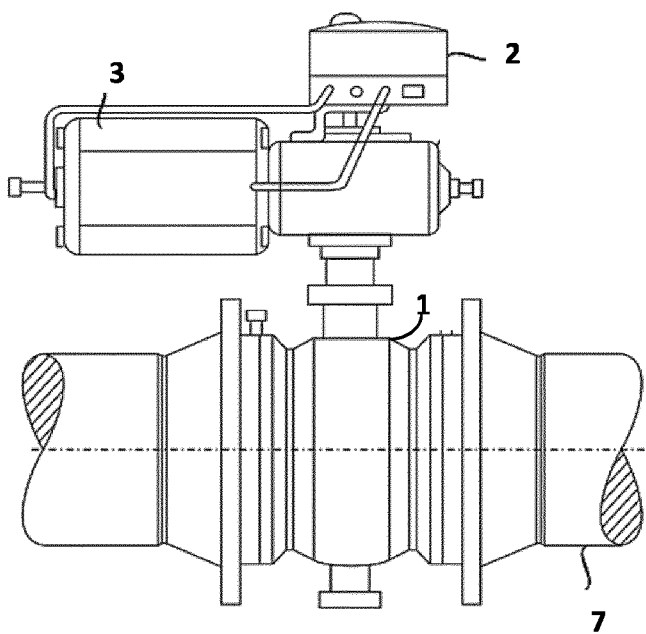
FIG. 2 illustrates an exemplary physical valve assembly wherein a pneumatic actuator operates a process valve under control of a valve positioner.

In the example of FIG. 1, a control valve assembly comprising a process valve 1 and a positioner 2 and an actuator 3 may be connected to a process to control the flow of a substance in a process pipeline 7. FIG. 2 shows a side view an exemplary physical valve assembly and its components a process valve 1, a positioner 2 and an actuator 3. Material flows of a process or process pipeline may be controlled in a processing industry, such as oil and gas, mining, pulp and paper, and chemical industries. The material flow may contain any fluid material, such as fluids, liquors, liquids, gases and steam. Although only one controlled process valve assembly is shown in FIG. 1, an automation system may, however, include any number of field devices, such as control valve assemblies, often hundreds of them. FIG. 2 illustrates a mechanical structure of an exemplary control valve assembly and its physical components: a pneumatic actuator 3, a control valve 1, and a valve positioner 2. An example of a control valve 1 is Neles® Finetrol eccentric rotary plug valve from Metso Corporation. An example of a valve positioner 2 wherein embodiments of the invention may be applied is Neles® NDX valve controller manufactured by Metso Corporation. An example of an actuator 3 is Quadra-Powr® X series pneumatic actuator from Metso Corporation. However, it is to be understood that, beyond the novel valve diagnostics, the type and implementation of the control valve assembly is not relevant to the present invention. As used herein, the term "control valve" also includes an on/off type shutoff valve.

There are various alternative ways to arrange the interconnection between the control system and field devices, such as control valves, in a plant area. In FIG. 1, the field/process bus 6 generally represents any such interconnection. Traditionally, field devices have been connected to the control system by two-wire twisted pair loops, each device being connected to the control system by a single twisted pair providing a 4 to 20 mA analog input signal. More recently, new solutions, such as Highway Addressable Remote Transducer (HART) protocol, that allow the transmission of digital data together with the conventional 4 to 20 mA analog signal in the twisted pair loop have been used in the control systems. The HART protocol is described in greater detail for example in the publication HART Field Communication Protocol: An Introduction for Users and Manufacturers, HART Communication Foundation, 1995. The HART protocol has also been developed into an industrial standard. Examples of other fieldbuses include Foundation Fieldbus and Profibus PA. However, it is to be understood that the type or implementation of the field/process bus 3 is not relevant to the present invention. The field/process bus 6 may be based on any one of the alternatives described above, or on any combination of the same, or on any other implementation.

Figure 3:
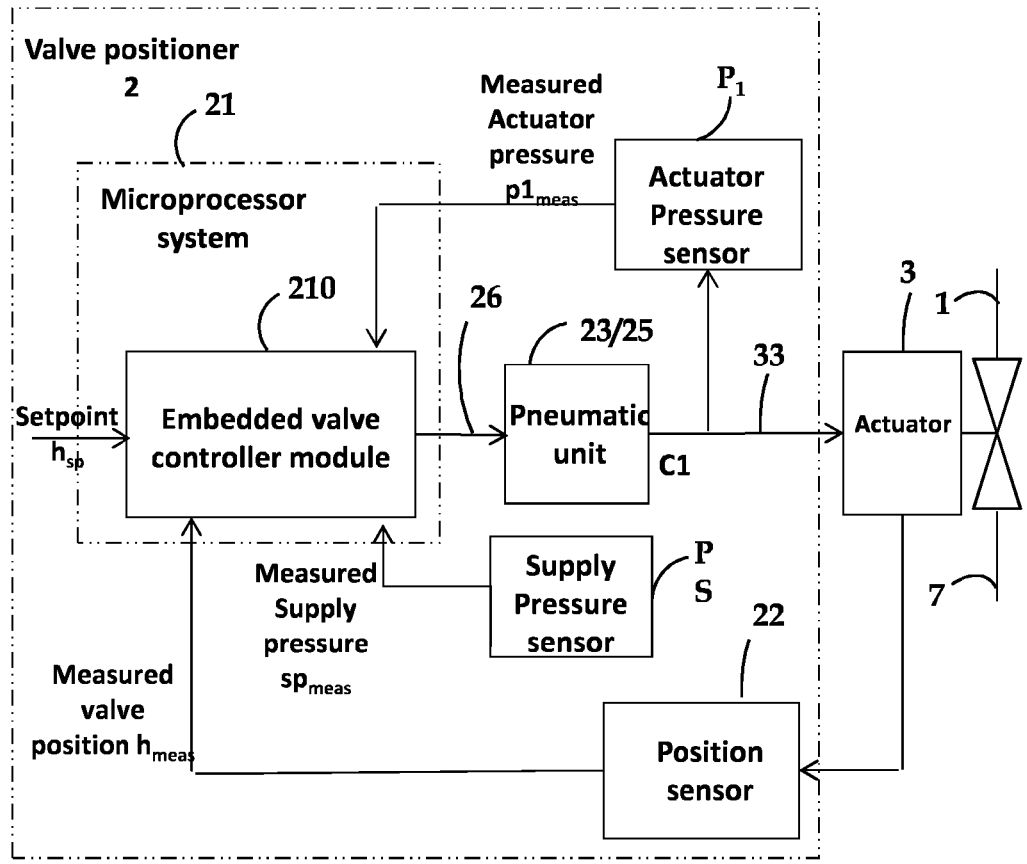
FIG. 3 illustrates a basic block diagram of an exemplary microcontroller-based smart valve positioner wherein valve diagnostics according to embodiments of the invention may be applied.
Figure 4:
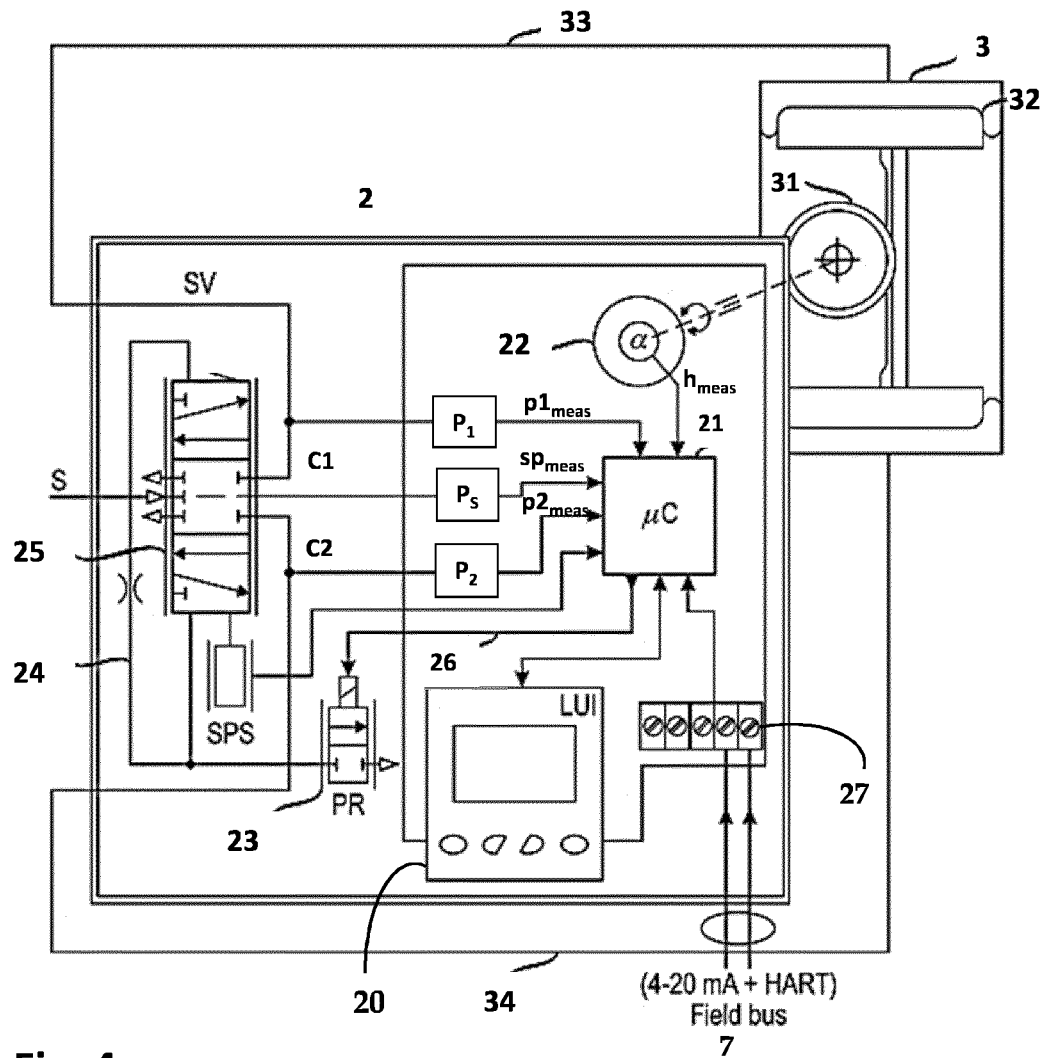
FIG. 4 shows a schematic block diagram of an exemplary intelligent valve controller wherein valve diagnostics according to embodiments of the invention may be applied.

A basic block diagram of an exemplary microcontroller-based smart valve positioner, such as positioner 2, is illustrated in FIG. 3. FIG. 4 shows a more detailed schematic block diagram of an exemplary intelligent valve controller 2. The exemplary positioner 2 may include a microcontroller unit 21 having an electrical control output 26, and a pneumatic unit 23/25 that may take in the electrical control signal 26 and convert it to a pneumatic actuator pressure p1 at an actuator port C1 that may be connected to a single-acting actuator pressure supply line 33. In the example of FIG. 4, the valve positioner 2 is configured to control a double-acting pneumatic actuator 3, and therefore illustrated to have two actuator ports C1 and C2 connected to an actuator 3 over actuator pressure supply lines 33 and 34, respectively. An actuator pressure sensor $P_1$ may be arranged to measure the pneumatic pressure at the actuator port C1 and to provide a measured actuator pressure $p1_{meas}$ signal, as illustrated in FIG. 3. A further actuator pressure sensor $P_2$ may be arranged to measure the pneumatic pressure p2 at the actuator port C2 and to provide a further measured actuator pressure $p2_{meas}$ signal, when a double-acting actuator 3 is operated. A supply pressure sensor PS may be arranged to measure the pneumatic supply pressure sp at the supply port SP and to provide a measured supply pressure $sp_{meas}$ signal. The pneumatic unit may comprise a pre-stage 23 and an output stage 25. The prestage 23 may perform an electric-to-pressure (I/P) conversion of the electrical control signal 26 into a pneumatic control signal 24, a pilot pressure, which is sufficient to control the output stage 25. The supply port S of the output stage 25 may be connected to an external supply air pressure S. The output stage 25 may amplify the small pneumatic pilot signal into a larger pneumatic actuator pressure outputs 33 and 34 at the actuator ports C1 and C2 to move diaphragm pistons 32 of the actuator 3. A position sensor 22 may be provided to measure the position of the actuator 3 or control valve 1, and provide a measured valve position (valve opening) $h_{meas}$ signal to the microcontroller system 21. For example, the position sensor 22 may be arranged to measure the rotation of a shaft 31 of the actuator 3, which rotation represents the valve position or opening. A microcontroller system 21 may control the valve position according to a control algorithm run in the microcontroller system 21. It should be appreciated that a specific control algorithm used is not relevant to the present invention. In the exemplary valve positioner 2 illustrated in FIG. 3, the control is performed by an embedded valve controller software module 210 which is stored and run in the microcontroller system 21. To that end, the embedded valve controller module 210 may receive an input signal (a set point $h_{sp}$), which may be received over a process/fieldbus 7, such as 4-20 mA pair and HART, connected to a connector 27, as illustrated in FIG. 4. The embedded valve controller module 210 may further receive the measured valve position $h_{meas}$ from the position sensor 22, and one or more of the measured actuator pressure $p1_{meas}$ from an actuator pressure sensor $P_1$ and the further measured actuator pressure $p2_{meas}$ from the further actuator pressure sensor $P_2$. Further, the embedded valve controller module 210 may receive the measured supply pressure $sp_{meas}$ from supply pressure sensor PS. Based on the setpoint and measurements, the embedded valve controller module 210 may control the value of the electrical control signal 26 to achieve a desired control action. The positioner 2 may further contain a Local User Interface (LUI) 20 connected to the microcontroller 21. The microcontroller 21 may display any information on a display of the local user interface 20, and receive commands and parameters from a keypad or buttons of the local user interface 20. The positioner 2 may be powered from a 4-20 mA loop or fieldbus. It should be appreciated that the illustrated valve positioner is merely an example and the type or implementation of a valve positioner 2, beyond valve diagnostics, is not relevant to the present invention.

An aspect of the invention is to create a diagnostics or prognosis platform that is able indicate and identify which part of the valve assembly has failed or will fail next.

According to an aspect of the invention, new fault diagnostics may be provided by a utilizing an embedded tracking digital twin of at least one physical part of a valve assembly in a microprocessor system of the valve positioner. The embedded tracking digital twin comprises a plurality of simulation model parameters which include at least one fault-related simulation model parameter. A fault-related simulation model parameter relates to or is representative of a specific physical fault in the at least one physical part of the valve assembly. By running an embedded tracking digital twin (i.e. a tracking simulation model) of at least one physical part of a valve assembly in real-time inside a valve positioner, and by considering various faults in the virtual domain using fault-related simulation model parameters, reliable on-line fault detections, fault identifications, and even predictions about valve faults, can be made. Simulations, fault detections and fault predictions can be made inside a valve positioner or controller or in a remote computing entity or distributed between a valve positioner and one or more remote computing entity.

Generally, a digital twin is a (digital) virtual model of a physical asset in the physical world. A simulation-based digital twin concept incorporates the physical asset (e.g. product or process), a simulation model (models) and connections that facilitate communications between the two. According to embodiments of the invention, the digital twin may include a simulation model that has been developed to duplicate the current condition of the physical asset, by incorporating fault-related simulation model parameters into the simulation model.

Figure 5:
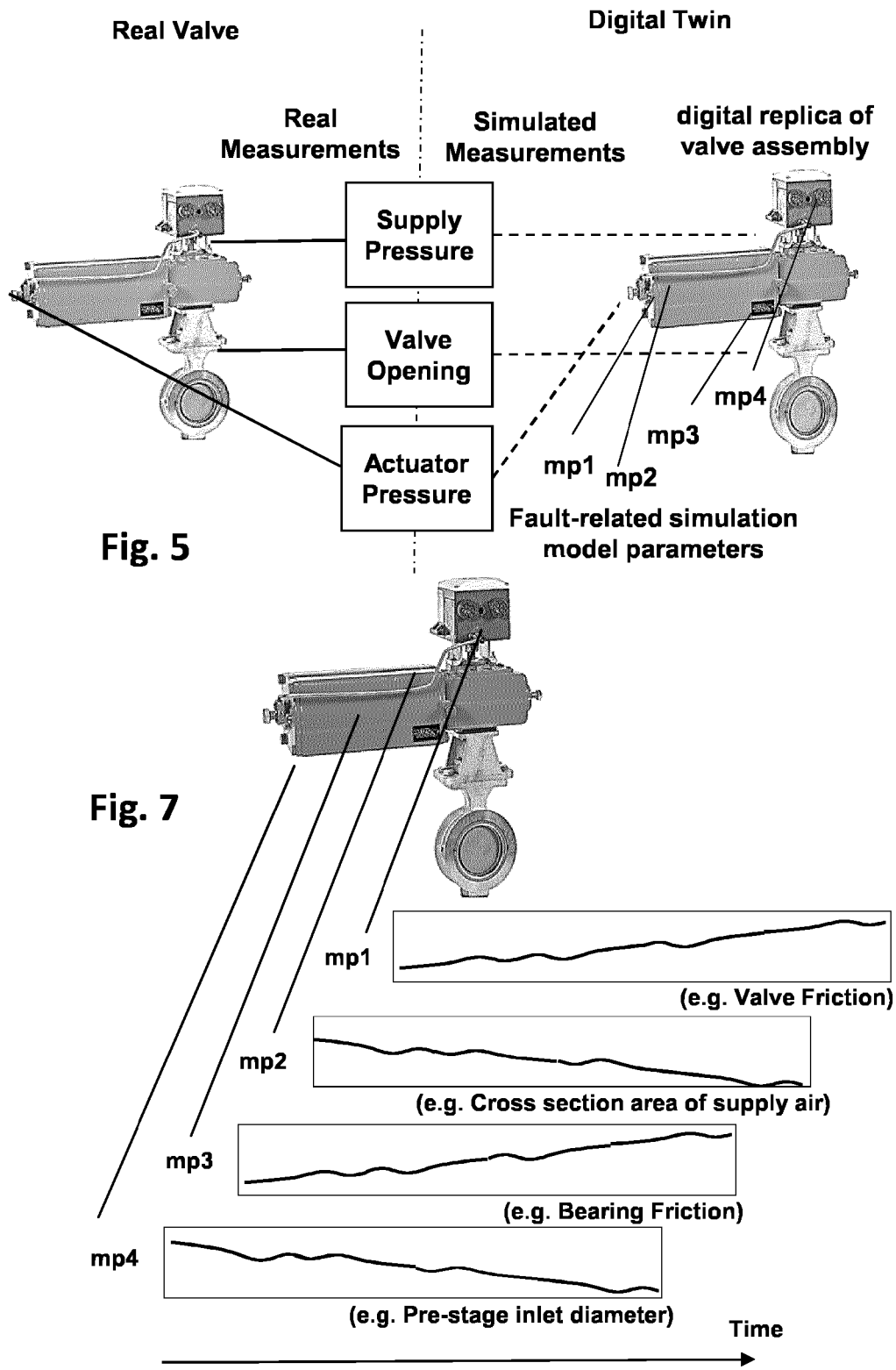
FIG. 5 illustrates an example of a digital twin concept according to the invention.

In embodiments of the invention, the physical asset may include at least part of the valve assembly, such as one of a physical control valve, a physical pneumatic valve actuator, a physical pneumatic pre-stage in a valve positioner, a pneumatic output stage in a valve positioner, a supply pressure inlet, or any combination thereof. An example of a digital twin concept according to is illustrated in FIG. 5.

Figure 6:
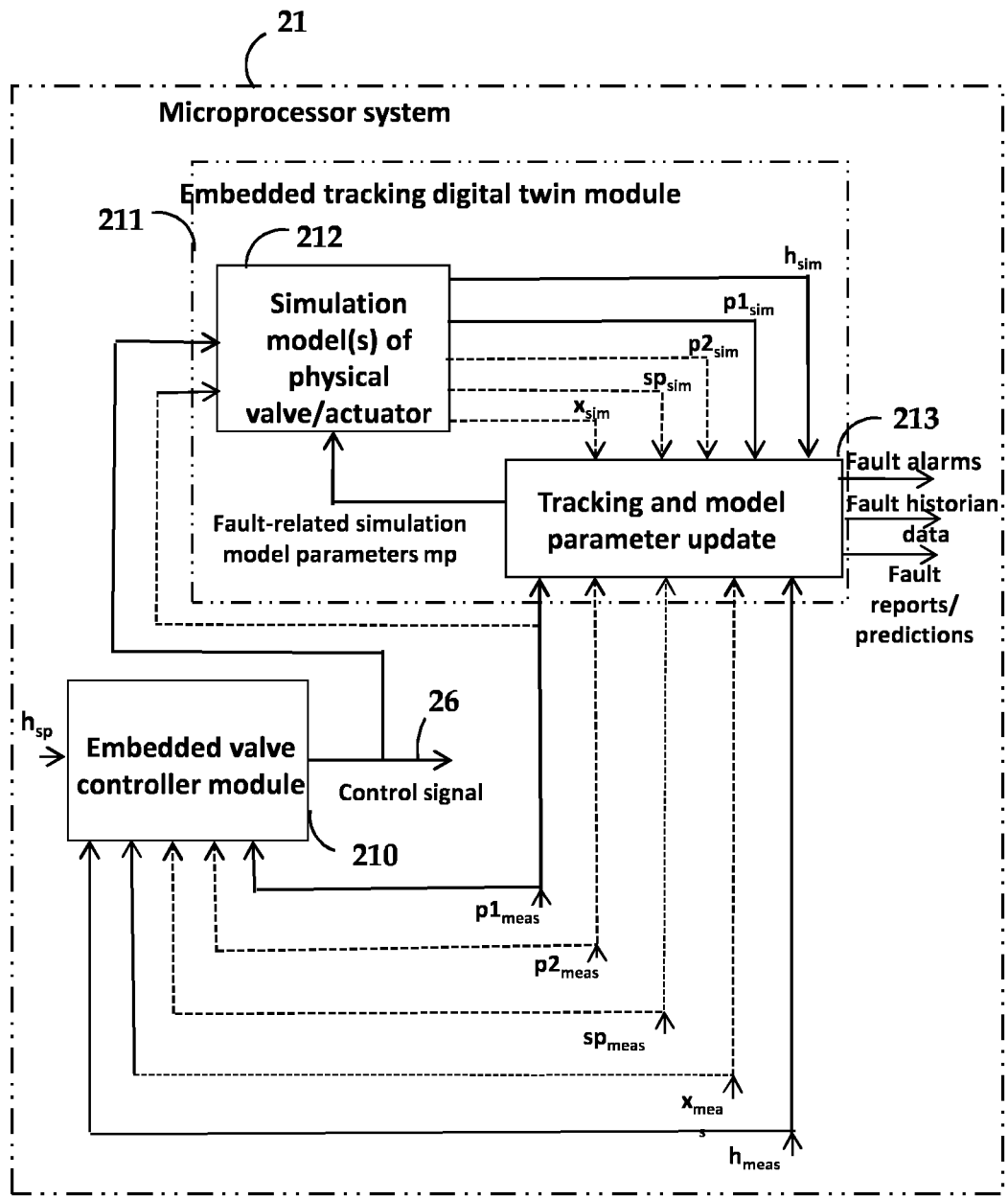
FIG. 6 shows a basic functional block diagram of a microprocessor system of a valve positioner according to exemplary embodiments.

FIG. 6 shows a basic functional block diagram of an exemplary microprocessor system of a valve positioner, such as the microprocessor system 21 of a valve positioner illustrated in the examples of FIGS. 3 and 4. The microprocessor system 21 may be configured to store and run an embedded valve controller software module 210 and an embedded tracking digital twin software module 211. The embedded valve controller software module 210 may be, for example, similar to the embedded valve controller software module 210 described above with reference examples of FIGS. 3 and 4.

In embodiments, the embedded valve controller may receive a setpoint position and the measured valve position and output a control signal to control the pneumatic actuator pressure of the pneumatic valve actuator and thereby the valve position of the control valve. In exemplary embodiments illustrated in FIG. 6, the embedded valve controller software module 210 may receive a set point $h_{sp}$ for valve position, a measured valve position (valve opening) $h_{meas}$, and a measured actuator pressure $p1_{meas}$ (optionally the further measured actuator pressure $p2_{meas}$, particularly in the case the actuator 3 is a dual-acting actuator). Further, the embedded valve controller module 210 may receive the measured supply pressure $sp_{meas}$. Based on the setpoint and measurements, the embedded valve controller module 210 may control the value of the electrical control signal 26 to achieve a desired control action in the physical valve assembly in accordance with a control algorithm or method employed in a specific application.

In embodiments, the embedded tracking digital twin may be configured to receive same controls and control actions as those provided by the embedded valve controller to a physical pneumatic actuator and/or a physical control valve, and in response to the controls and control actions, to generate at least one simulated measurement result (representing a simulated result of a control action) corresponding to at least one real physical measurement result measured from the physical pneumatic actuator and/or the physical control valve. In exemplary embodiments illustrated in FIG. 6, the embedded tracking digital twin module 211 may receive a control signal representing a real control of the at least part of the physical valve assembly, and one or more real measurements relating to the result of the real control in the at least part of the physical valve assembly. Such a control signal may include the electrical control signal 26, and/or one or more the real measurements. The real measurements relating to the result of the real control in the at least part of the physical valve assembly may include one or more of the measured valve position (valve opening) $h_{meas}$ the measured actuator pressure $p1_{meas}$ (optionally also the further measured actuator pressure $p2_{meas}$), and the measured supply pressure $sp_{meas}$, a measured control pressure (e.g. a pilot pressure) from the prestage, a measured control position of a pneumatic output stage (e.g. spool position) and/or any other real measurements $x_{sim}$ that may be useful (e.g. temperature or a process pressure). Based on the real control and the real measurements, the embedded tracking digital twin module 211 may generate one or more simulated measurement results (representing a simulated result of the real control), such as a simulated valve position $h_{sim}$, a simulated actuator pressure $p1_{sim}$ (optionally also a further measured actuator pressure $p2_{sim}$), a simulated supply pressure $sp_{meas}$, a simulated control pressure (e.g. a pilot pressure) from the prestage a simulated control position of a pneumatic output stage (e.g. spool position) and/or any other simulated measurements $x_{sim}$ that may be useful (e.g. a valve temperature or a process pressure). For example, for a simulation model of a physical valve only, a real control inputted to the simulation may be the measured actuator pressure $p1_{meas}$ (optionally also the further measured actuator pressure $p2_{meas}$), as illustrated by a broken line in FIG. 6, and the simulated result of the control may be a simulated valve position $h_{sim}$. As another example, for a simulation model of a pneumatic output stage only, a real control inputted to the simulation may be the measured pilot pressure and the simulated result of the control may be the simulated actuator pressure $p1_{meas}$ (optionally also a further simulated actuator pressure $p2_{sim}$), In the exemplary embodiments of FIG. 6, the simulated measurements may be generated by a simulation block 212 of the embedded tracking digital twin that incorporates a simulation model or simulation models of at least part of a physical valve assembly, such as a simulation model of a physical valve 1, a pneumatic prestage, a pneumatic output stage, a supply pressure inlet and/or a pneumatic actuator 3.

The simulation model 212 comprises a plurality of simulation model parameters which include at least one fault-related simulation model parameter. A fault-related simulation model parameter may relate to or be representative of a specific physical fault in the at least one physical part of the valve assembly. In embodiments, there may be a plurality of fault-related simulation model parameters which relate to a plurality of different specific physical faults in physical part or parts of the valve assembly. In embodiments, the at least one fault-related simulation model parameter represents a specific physical characteristic of the at least one physical part of the valve assembly, such a physical dimension or a friction, and the value of the specific physical characteristic is related to a specific physical fault. In embodiments of the invention, the at least one fault-related simulation model parameter may be related to one or more of following specific physical characteristics: a valve friction, a cross-sectional size of a pneumatic air supply, a cross-sectional size of a pilot pressure inlet, a cross-sectional size of an actuator pressure leakage hole, a valve friction, a bearing friction, a backlash, fatigue, erosion, wear.

In embodiments, the embedded tracking digital twin may track an error or difference between the at least one simulated measurement result representing a simulated result of a control action (such as the simulated measured valve position and/or the simulated measured pneumatic actuator pressure), and the at least one corresponding real physical measurement result (such as the measured valve position and/or the measured pneumatic actuator pressure), and adjust a value of the at least one fault-related simulation model parameter of the embedded tracking digital twin in a sense that the error or difference is decreased, in real-time during operation of the valve assembly. In exemplary embodiments illustrated in FIG. 6, the embedded tracking digital twin module 211 may be provided with a tracking and model parameter update block 213 that may receive one or more simulated measurement results (representing a simulated result of the real control), such as the simulated valve position $h_{sim}$, the simulated actuator pressure $p1_{sim}$ (optionally also the further measured actuator pressure $p2_{sim}$), the simulated supply pressure $sp_{meas}$, the simulated control pressure (e.g. a pilot pressure) from the prestage, the simulated control position of a pneumatic output stage (e.g. spool position) and/or any other simulated measurements xsim that may be useful (e.g. a valve temperature or a process pressure), from the simulation block 212. The tracking and model parameter update block 213 may the measured valve position (valve opening) $h_{meas}$, and the measured actuator pressure $p_{meas}$ (optionally also the further measured actuator pressure $p_{meas}$). The tracking and model parameter update block 213 may compare the simulated and measured values to track an error or difference between the results of simulated operation of the digital twin and the real operation of the physical asset. As the simulation model is built in a manner that includes one or more fault related simulation model parameters, the tracking and model parameter update block 213 is able to consider or test whether the error or difference in the simulated and real operation is due to one or more of these fault-related simulation parameters. In the case it is determined that the error or difference can be decreased by adjusting or updating value or values of one or more of the fault-related simulation model parameters, the model parameters in the simulation model in the simulation block 212 may be updated accordingly. As each fault-related simulation model parameter may be related to or representative of a specific physical fault in the physical valve assembly, the change in the value of the fault-related simulation model parameter may be indicative of existence or development of the specific physical fault. Therefore, existence of the specific physical fault and/or predict the development of the specific physical fault in the valve assembly can be detected. Thus, by considering various faults in the virtual domain, reliable on-line predictions about valve assembly faults can be provided. In embodiments, the embedded tracking digital twin 211 may store history and/or trend of values of the fault-related simulation model parameters in a memory of the microprocessor system 21 in real time or at predetermined longer intervals, such as once an hour, once a day, once a week, etc. In embodiments, the history and/trend data may be analysed in the microprocessor system 21, preferably in the embedded tracking digital twin. The microprocessor system, preferably the embedded tracking digital twin 211. may store and/or generate fault alarms and reports on faults in the valve assembly based on values of the fault-related simulation model parameters in a memory of the microprocessor system 21. In embodiments, the microprocessor system, preferably the embedded tracking digital twin 211, may be configured to detect and identify the specific physical fault in the at least one physical part of the valve assembly when the adjusted value of the at least one fault-related simulation model parameter reaches a predetermined threshold value or a predetermined deviation. In embodiments, the microprocessor system, preferably the embedded tracking digital twin 211, be may configured to predict a future trend of the adjusted value of the at least one fault-related simulation model parameter over the time, and to predict a remaining operation time until the adjusted value of the at least one fault-related simulation model parameter reaches a given limit value or a given deviation limit. In embodiments, at least part of the fault detection and identification, fault alarms, fault reporting, the fault prediction, and other diagnosis or prognosis routines may be performed by a remote computing component in a process control system or a maintenance monitoring system, such as a process computer or a maintenance monitoring computer, based on the values of the fault-related simulation model parameters. In embodiments, execution of at least part of the fault detection and identification, fault alarms, fault reporting, the fault prediction, and other diagnosis or prognosis routines may be distributed among the microprocessor system of the valve positioner and a remote a remote computing component in a process control system or a maintenance monitoring system.

FIG. 7 shows illustrative trends of physical values of fault-related simulation model parameters mp1, mp2, mp3, and mp4. In the example, the physical values of parameters mp1 and mp3 increase with time from the initial value. Examples of fault-related physical simulation model parameters whose increasing value may indicate or predict a specific physical fault include a valve friction and a bearing friction. An increasing valve friction may indicate a sticky valve and wearing of a valve seat. A change in the bearing friction may indicate damaged bearings in the valve assembly. In the example, the physical values of parameters mp2 and mp4 decrease with time from the initial value. Examples of fault-related physical simulation model parameters whose decreasing value may indicate or predict a specific physical fault include a cross-sectional area of an air supply and a pilot pressure inlet diameter of a pneumatic pre-stage of a valve positioner. They may indicate a gradual blocking of the air supply or the pilot pressure inlet due to dirt or some other reason. As the fault can be readily detected or predicted by means of the digital twin concept of the invention, and the positioner or a remote device analyzing the fault-related physical simulation model parameters can tell and identify the fault component or part, necessary service actions can be made immediately or scheduled to be made at an appropriate time by the maintenance personnel without need to analyse various reports. In the example, the necessary service actions may be to clean the air supply inlet or pilot pressure inlet, or replacement of bearings or a valve closure/seat.

Figure 8:
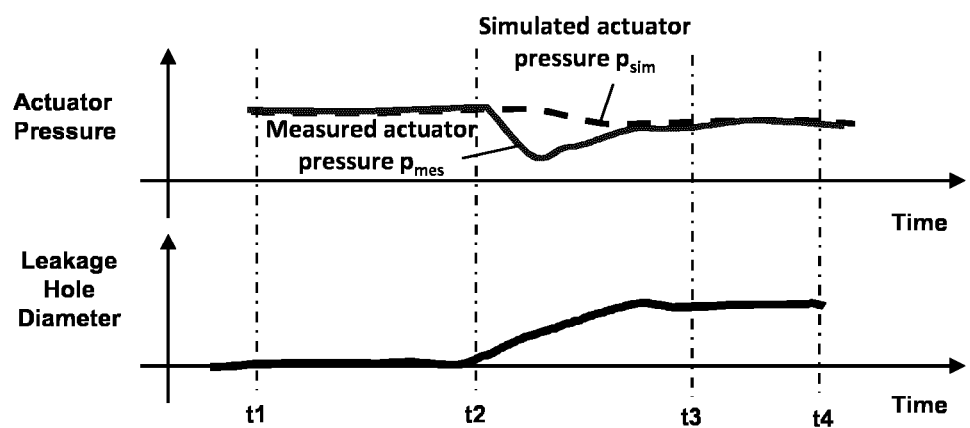
FIG. 8 shows an example of updating a fault-related simulation model parameter in real time during operation.

Now exemplary operation of an embedded tracking digital twin 211 is discussed by means of an example illustrated in FIG. 8. In FIG. 8, the embedded tracking digital twin 211 may track an error or difference between the simulated pneumatic actuator pressure $p_{sim}$ (dashed line) and the measured pneumatic actuator pressure $p_{meas}$ (solid line). During normal operation of the valve assembly, such as within the time period t1-t2, the simulated actuator pressure $p_{sim}$ follows quite accurately the measured pneumatic actuator pressure $p_{meas}$, i.e. the trend lines substantially overlap. The tracking and model parameter update block 213 observes the simulated and measured values are substantially equal, i.e. there is no error, difference or deviation and no need to adjust any of the simulation model parameters. In FIG. 8 a single fault-related parameter, a leakage hole diameter, is shown as an example of a plurality of simulation model parameters that may be utilized in the simulation model. The leakage hole diameter may relate to an air leakage in the pneumatic actuator 3, for example due to a hole in an actuator membrane and/or a leakage over an actuator piston, etc. The leakage hole diameter may represent a cross-sectional size of a single "virtual" hole for the total air leakage that may be a combination of multiple leakages in the actuator 3. In the case the only fault is the hole in the actuator membrane, the diameter of the "virtual" leakage hole will be substantially equal to that of the real hole in the actuator membrane. In the example of FIG. 8, tracking and model parameter update block 213 does not adjust any of the simulation model parameters, and also the leakage hole diameter is substantially unchanged during the time period t1-t2.

However, during a fault in the valve assembly, the simulated actuator pressure $p_{sim}$ and the measured pneumatic actuator pressure $p_{meas}$ begin to diverge, such as shortly after time instant t2 in FIG. 8. This due to that the simulation model 212 of the physical valve assembly still simulates the unfaulty valve assembly and not the actual faulty valve assembly. The tracking and model parameter update block 213 detects the divergence (error, difference, deviation) and begins in real time to determine an updated value for one or more fault-related simulation model parameters of the embedded tracking digital twin in a sense that the error or difference is decreased. In the example of FIG. 8, during the timer period t2-t3, the tracking and model parameter update block 213 gradually increases the diameter of the leakage hole in the simulation model so that the simulated pneumatic actuator pressure $p_{sim}$ and the measured pneumatic actuator pressure $p_{meas}$ converge and finally overlap the time instant t3. The situation is stabilized and no further updating of simulation parameters will be needed during the time period t3-t4. The increased physical value of the fault-related parameter "Leakage hole diameter" directly indicates a leakage fault in the pneumatic actuator 3. The specific fault-related parameter also gives clear maintenance-relevant information, a physical diameter of the leakage hole. This information or measure can be utilized to determine how severe the fault is, e.g. whether the fault requires immediate service, or to predict the remaining useful lifetime of the actuator 3 until the next maintenance action shall be scheduled. It should be appreciated that the periods t1-t2, t2-t3, and t3-t4 can be very long periods of time, such as hours, days, weeks, months or years, in relation to the real time update of parameters that may be multiple times per second, for example.

Figure 9:
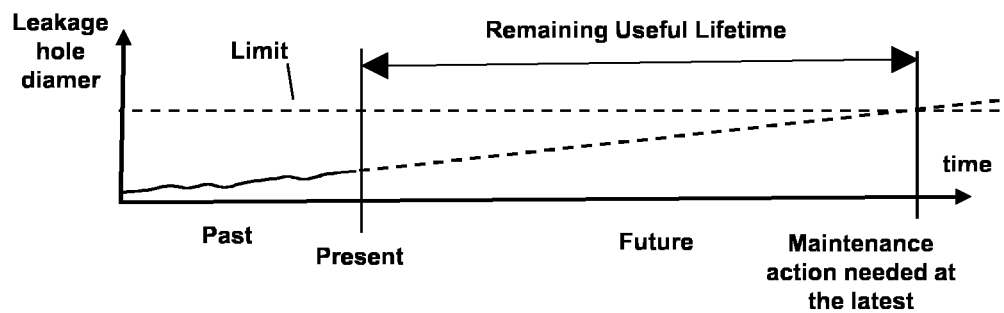
FIG. 9 illustrates an example of predicting a remaining useful lifetime.

FIG. 9 illustrates an example of predicting a remaining useful lifetime. The past values of the fault-related simulation model parameter (the leakage hole diameter in this example) create a historian trend of the development of the fault. In embodiments, the microprocessor system 21, preferably the embedded tracking digital twin 211 may, based on the past behavior of the fault or the parameter, simulate the future trend of the fault-related simulation model parameter over time, e.g. until the value of the fault-related simulation model parameter reaches a given limit value or a given deviation limit, or until the detected and identified specific fault reaches a given limit level. In embodiments, the microprocessor system 21, preferably the embedded tracking digital twin 211 may, based on the past behavior of the fault or the parameter, interpolate the future trend of a fault-related simulation model parameter mathematically. It should be appreciated that, depending on the specific fault in question, the time period past-to-present and the remaining useful lifetime can be very long periods of time, because the value of the fault-related simulation model parameter (such as friction of a valve) may change very slowly over the time until a limit is reached.

It will be obvious to a person skilled in the art that, as the technology advances, the inventive concept can be implemented in various ways. The invention and its embodiments are not limited to the examples described above but may vary within the scope of the claims.

The invention claimed is:

1. A valve positioner, wherein
the valve positioner is configured to be installed in a valve assembly comprising the valve positioner, a control valve, a pneumatic valve actuator, a pressure sensor adapted to measure a pneumatic actuator pressure and a position sensor adapted to measure a valve position of the control valve,
the valve positioner is configured to control the valve position of the control valve, utilizing the pneumatic valve actuator,
the valve positioner comprises a microprocessor system configured to control the valve positioner to affect the control of the valve position of the control valve, receive a setpoint position, the measured valve position, and one or more real physical measurement results, and store and run embedded valve control and diagnostics software including
an embedded valve controller configured to:
  (i) receive the setpoint position and at least the measured valve position, and
  (ii) cause the microprocessor system to control the valve positioner to affect the control of the valve position of the control valve, and
an embedded tracking digital twin of at least one physical part of the valve assembly, the embedded tracking digital twin comprising a plurality of simulation model parameters, the plurality of simulation model parameters including at least one fault-related simulation model parameter that relates to a specific physical fault in the at least one physical part of the valve assembly, the at least one fault-related simulation model parameter being related to one of the following specific physical dimensions: a cross-sectional size of a pneumatic air supply, a cross-sectional size of a pilot pressure inlet, and a cross-sectional size of an actuator pressure leakage hole, the embedded tracking digital twin is configured to:
(i) receive a control signal representing a real control of the part of the physical valve assembly caused by the embedded valve controller,
(ii) provide at least one simulated measurement result representing a simulated result of a control action in real-time during operation of the valve assembly,
(iii) track an error between the at least one simulated measurement result and the at least one corresponding real physical measurement result, and
(iv) adjust a value of the at least one fault-related simulation model parameter of the embedded tracking digital twin such that the error is decreased, in real-time during operation of the valve assembly, and
the specific physical fault in the at least one physical part of the valve assembly is detectable and identifiable based on the adjusted value of the at least one simulation model parameter.

2. The valve positioner according to claim 1, wherein the embedded tracking digital twin of the software comprises an embedded tracking digital twin of one or more of the control valve, the pneumatic valve actuator, a pneumatic pre-stage in the valve positioner, a supply pressure inlet, a pneumatic output stage in the valve positioner, and any combination thereof.

3. The valve positioner according to claim 1, wherein
the microprocessor system is configured to receive a measured pneumatic actuator pressure, and
the embedded tracking digital twin is configured to
(i) receive the control signal from the embedded valve controller, provide, as the at least one simulated measurement result, a simulated measured valve position and/or a simulated measured pneumatic actuator pressure in real-time during operation of the valve assembly, and track the error between the at least one simulated measurement result and the at least one corresponding real physical measurement result as at least an error between the simulated measured valve position and the measured valve position and/or an error between the simulated measured pneumatic actuator pressure and the measured pneumatic actuator pressure, and
(ii) adjust a value of the at least one fault-related simulation model parameter of the embedded tracking digital twin such that that the error between the simulated measured valve position and the measured valve position and/or the error between the simulated measured pneumatic actuator pressure and the measured pneumatic actuator pressure is decreased, in real-time during operation of the valve assembly.

4. The valve positioner according to claim 1, wherein the control signal representing the real control of the at least part of the physical valve assembly includes an electrical control signal to a prestage and/or one or more of the at least one real physical measurement result.

5. The valve positioner according to claim 1, wherein the at least one real physical measurement result relating to the result of the real control in the at least part of the physical valve assembly may include one or more of: the measured valve position, the measured actuator pressure, a further measured actuator pressure, a measured supply pressure, a measured pilot pressure from a pneumatic prestage, a measured control position of a pneumatic output stage, a temperature, and a process pressure.

6. The valve positioner according to claim 1, wherein the valve assembly further comprises a pressure sensor adapted to measure a pneumatic supply pressure, and wherein the embedded tracking digital twin is configured to receive the measured pneumatic supply pressure and to utilize it in adjustment of the plurality of simulation model parameters.

7. The valve positioner according to claim 1, wherein the microprocessor system of the valve positioner and/or a remote computing entity is configured to detect and identify the specific physical fault in the at least one physical part of the valve assembly when the adjusted value of the at least one fault-related simulation model parameter reaches a predetermined threshold value or a predetermined deviation.

8. The valve positioner according to claim 1, wherein the microprocessor system of the valve positioner and/or a remote computing entity is configured to predict a future trend of the adjusted value of the at least one fault-related simulation model parameter over the time, and to predict a remaining operation time until the adjusted value of the at least one fault-related simulation model parameter reaches a given limit value or a given deviation limit.

9. The valve positioner according to claim 1, wherein the microprocessor system of the valve positioner and/or a remote computing entity is configured to predict a remaining useful lifetime of the at least one physical part of the valve assembly.

10. The valve positioner according to claim 1, wherein the plurality of simulation model parameters includes a plurality of fault-related simulation model parameters which relate to a plurality of different specific physical faults in the at least one physical part of the valve assembly.

11. The valve positioner according to claim 1, wherein the at least one fault-related simulation model parameter includes a further fault-related simulation model parameter that represents a further specific physical characteristic of the at least one physical part of the valve assembly, such a physical dimension or a friction, and wherein the value of the specific physical characteristic is related to a specific physical fault.

12. The valve positioner according to claim 1, wherein the at least one fault-related simulation model parameter isincludes one or more further fault-related simulation model parameters related to one or more of following specific physical characteristics: a valve friction, a cross-sectional size of a pneumatic air supply, a valve friction, a bearing friction, a backlash, fatigue, erosion, wear.

13. A diagnostic method in a valve positioner of a valve assembly, comprising
measuring a pneumatic actuator pressure of a pneumatic valve actuator of the valve assembly;
measuring a valve position of a control valve of the valve assembly,
running an embedded valve controller in real-time in a microprocessor system of the valve positioner;
causing, by the embedded valve controller, the microprocessor system of the valve positioner to control the pneumatic actuator pressure of the pneumatic valve actuator and thereby the valve position of the control valve based on a setpoint position and the measured valve position in real-time during operation of the valve assembly,
running an embedded tracking digital twin of at least one physical part of the valve assembly in the microprocessor system of the valve positioner, wherein the embedded tracking digital twin comprises a plurality of simulation model parameters, the plurality of simulation model parameters including at least one fault-related simulation model parameter that relates to a specific physical fault in the at least one physical part of the valve assembly, wherein the at least one fault-related simulation model parameter includes a fault-related simulation model parameter related to one of the following specific physical dimensions: a cross-sectional size of a pneumatic air supply, a cross-sectional size of a pilot pressure inlet, and a cross-sectional size of an actuator pressure leakage hole;

receiving, by the embedded tracking digital twin, a control signal rep-resenting a real control of the at least part of the physical valve assembly from the embedded valve controller and to provide at least one simulated measurement result representing a simulated result of a control in real-time during operation of the valve assembly;

generating, by the embedded tracking digital twin, at least one simu-lated measurement result representing a simulated result of a control action in real-time during operation of the valve assembly;

tracking, by the embedded tracking digital twin, an error between the at least one simulated measurement result and at least one corresponding real physical measurement result in real-time during operation of the valve assembly; and adjusting, by the embedded tracking digital twin, a value of the at least one fault-related simulation model parameter of the embedded tracking digital twin such that the error is decreased, in real-time during operation of the valve assembly, wherein the specific physical fault in the at least one physical part of the valve assembly is identifiable based on the adjusted value of the at least one simulation model parameter.

14. A valve assembly comprising
a control valve;
a pneumatic valve actuator;
a pressure sensor adapted to measure a pneumatic actuator pressure;
a position sensor adapted to measure a valve position of the control valve; and
a valve positioner configured to control the valve position of the control valve utilizing the pneumatic valve actuator, wherein the valve positioner comprises a microprocessor system configured to control the valve positioner to affect the control of the valve position of the control valve, receive a setpoint position, the measured valve position, and one or more real physical measurement results, and store and run an embedded valve control and diagnostics software including an embedded valve controller configured to:
(i) receive the setpoint position and at least the measured valve position, and
(ii) cause the microprocessor system to control the valve positioner to affect the control of the valve position of the control valve, and an embedded tracking digital twin of at least one physical part of the valve assembly, the embedded tracking digital twin comprising a plurality of simulation model parameters, the plurality of simulation model parameters including at least one fault-related simulation model parameter that relates to a specific physical fault in the at least one physical part of the valve assembly, the at least one fault-related simulation model parameter being related to one of following specific physical dimensions: a cross-sectional size of a pneumatic air supply, a cross-sectional size of a pilot pressure inlet, and a cross-sectional size of an actuator pressure leakage hole, wherein the embedded tracking digital twin is configured to:

(i) receive a control signal representing a real control of the part of the physical valve assembly caused by the embedded valve controller, (ii) provide at least one simulated measurement result representing a simulated result of a control action in real-time during operation of the valve assembly, (iii) track an error between the at least one simulated measurement result and the at least one corresponding real physical measurement result, and (iv) adjust a value of the at least one fault-related simulation model parameter of the embedded tracking digital twin such that the error is decreased, in real-time during operation of the valve assembly, and the specific physical fault in the at least one physical part of the valve assembly is detectable and identifiable based on the adjusted value of the at least one simulation model parameter.

* * * * *